United States Patent
Iwai

(10) Patent No.: US 12,056,679 B2
(45) Date of Patent: Aug. 6, 2024

(54) DETECTION APPARATUS FOR DETECTING ABNORMAL OPERATIONS AT A POINT OF SALES APPARATUS

(71) Applicant: TOSHIBA TEC KABUSHIKI KAISHA, Tokyo (JP)

(72) Inventor: Toshiki Iwai, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 193 days.

(21) Appl. No.: 17/742,303

(22) Filed: May 11, 2022

(65) Prior Publication Data
US 2023/0022924 A1    Jan. 26, 2023

(30) Foreign Application Priority Data
Jul. 21, 2021 (JP) ................................ 2021-120483

(51) Int. Cl.
G06Q 20/20    (2012.01)
(52) U.S. Cl.
CPC ......... *G06Q 20/206* (2013.01); *G06Q 20/202* (2013.01)
(58) Field of Classification Search
CPC ..... G06Q 20/206; G06Q 20/202; G06V 40/20
See application file for complete search history.

(56) References Cited

U.S. PATENT DOCUMENTS

| 2007/0205277 | A1  | 9/2007 | Tashiro |
|---|---|---|---|
| 2008/0218591 | A1* | 9/2008 | Heier .................... G06Q 20/20 348/E7.091 |
| 2011/0087535 | A1* | 4/2011 | Yoshizawa ............ G06Q 20/20 705/16 |

(Continued)

FOREIGN PATENT DOCUMENTS

| JP | 2007-233828 A | 9/2007 |
|---|---|---|
| JP | 5310776 B | 10/2013 |

(Continued)

OTHER PUBLICATIONS

Office Action mailed May 9, 2024 in corresponding Korean Patent Application No. 10-2022-0076709, 8 pages (with Translation).

*Primary Examiner* — A. Hunter Wilder
*Assistant Examiner* — Joseph M Mutschler
(74) *Attorney, Agent, or Firm* — Kim & Stewart LLP

(57) ABSTRACT

A detection apparatus for detecting abnormal operations at a point of sales (POS) terminal in a POS system that includes the POS terminal and an attendant terminal for monitoring the status of the POS terminal. The detection apparatus includes a camera interface connected to a camera for capturing images of customers operating the POS terminal, a network interface to communicate with a display control apparatus for the attendant terminal, and a processor configured to identify an action performed by a customer using an image thereof, identify an operation performed on the POS terminal by the customer based on changes in monitoring screen data generated by the display control apparatus for the attendant terminal, detect whether an abnormal operation is performed by the customer based on the identified actions and operations, and control the network interface to transmit a notification to the attendant terminal when an abnormal operation is performed.

20 Claims, 13 Drawing Sheets

(56) References Cited

U.S. PATENT DOCUMENTS

2015/0193780 A1* 7/2015 Migdal ................ G06Q 30/018
                                                                705/317
2018/0276456 A1   9/2018 Miyagi

FOREIGN PATENT DOCUMENTS

| JP | 2018-160140 A | 10/2018 |
| KR | 10-2017-0112315 A | 10/2017 |

* cited by examiner

FIG. 3

```
                    71                      72                        SC
           ┌────────────────┬──────────────────────────────┐
           │ REGISTER No.001│        REGISTERING           │
      73 ──┤ ERROR INFORMATION                             │
           │ ┌────────────┐                                │
           │ └────────────┘                                │
      74 ──┤ DECLARATION INFORMATION                       │
           │ ┌────────────┐                                │
           │ │BAG UNNECESSARY│    NUMBER OF                │
           │ COMMODITY NAME    COMMODITIES      PRICE      │
      75 ──┤  ┌──────────────────────────────────────────┐ │
           │  │ AAAAA              ONE         100 YEN   │ │
           │  │ BBBBB              ONE         150 YEN   │ │
           │  │ CCCCC              ONE         250 YEN   │ │
           │  │                                          │ │
           │  └──────────────────────────────────────────┘ │
           │          ┌──────────────────────────────────┐ │
           │       76─│ TOTAL NUMBER OF COMMODITIES  THREE│ │
           │          │ TOTAL AMOUNT              500 YEN│ │
           │          │ DEPOSIT AMOUNT                   │ │
           │          │ CHANGE                           │ │
           │          └──────────────────────────────────┘ │
           └───────────────────────────────────────────────┘
```

| MC | MESSAGE |
|---|---|
| 91 | A customer has disappeared during commodity registration operation in the register with the register No. X |
| 92 | A customer has disappeared during settlement operation in the register with the register No. X |
| 93 | A customer has appeared in the register with the register No. X |

*FIG. 7*

| REGISTER No. | TRACKING ID | TIME TM | | | | STorMC |
|---|---|---|---|---|---|---|
| 1 | | | | | | |
| | --- | --- | | | | --- |

823

DETECTION APPARATUS FOR DETECTING ABNORMAL OPERATIONS AT A POINT OF SALES APPARATUS

CROSS-REFERENCE TO RELATED APPLICATION

This application is based upon and claims the benefit of priority from Japanese Patent Application No. 2021-120483, filed Jul. 21, 2021, the entire contents of which are incorporated herein by reference.

FIELD

Embodiments described herein relate generally to a detection apparatus for detecting a customer's abnormal operation at a point of sales (POS) apparatus, a POS system incorporating a detection apparatus, and a method for detecting abnormal operations.

BACKGROUND

In recent years, in retail stores such as a supermarket, a self-service POS terminal has been increasingly viewed as desirable from the viewpoint of reductions in labor cost, protections against infectious diseases, and the like. The self-service POS terminal is a settlement terminal that allows a customer to perform registration and settlement operations for purchasing commodities by himself or herself. Accordingly, it may happen that in some instances the customer goes away from the self-service POS terminal without properly completing the settlement.

BRIEF DESCRIPTION OF THE DRAWINGS

FIG. 3 is a schematic diagram illustrating a monitoring image displayed on a display of an attendant terminal.
FIG. 7 depicts a data structure of time-series data.

DETAILED DESCRIPTION

One or more of embodiments provide an information processing system, an information processing apparatus, and a non-transitory computer readable medium storing a control program that can appropriately detect a customer going away from a settlement terminal without completing settlement processing.

According to one embodiment, a detection apparatus for detecting abnormal operations at a point of sales (POS) terminal includes a camera interface configured to communicate with a camera for capturing an image of a customer who is operating the POS terminal, a network interface configured to communicate with a display control apparatus for an attendant terminal used for monitoring a status of the POS terminal, and a processor. The processor is configured to identify an action performed by a customer using an image of the customer received via the camera interface; identify an operation performed at the POS terminal by the customer based on changes in monitoring screen data generated by the display control apparatus for the attendant terminal and received via the network interface; detect whether an abnormal operation is performed by the customer based on the identified action and the identified operation; and upon detecting an abnormal operation, control the network interface to transmit a first notification to the attendant terminal.

Embodiments are explained below with reference to the drawings.

Figure 1:
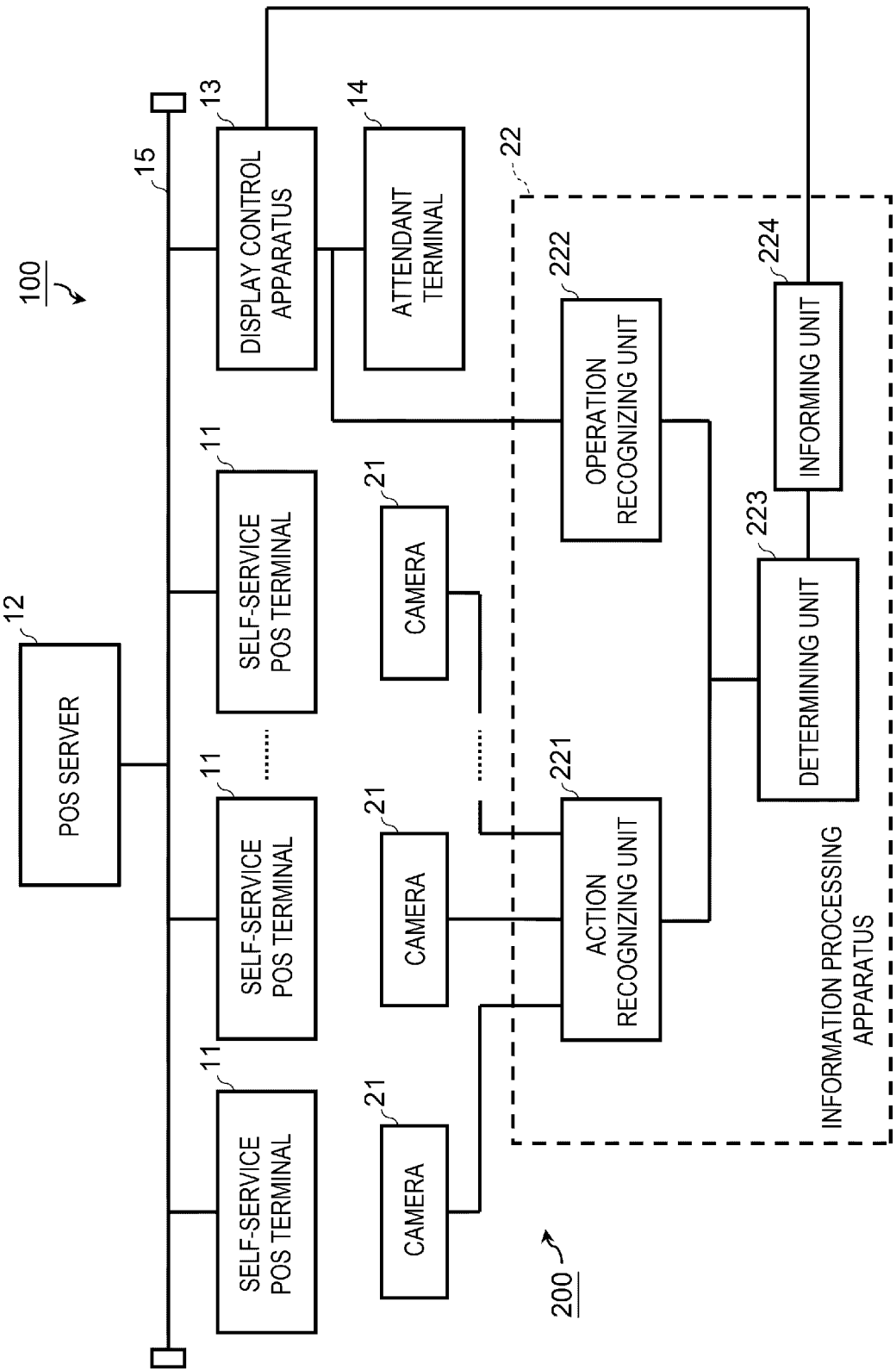
FIG. 1 is a schematic diagram of a store system including a self-service POS terminal.

FIG. 1 is a schematic diagram of a store system installed for a retail store and including a plurality of self-service POS terminals. This system includes a self-service POS system 100 and an information processing system 200. The self-service POS system 100 includes a plurality of self-service POS terminals 11, a POS server 12, a display control apparatus 13, an attendant terminal 14, and a communication network 15. The plurality of self-service POS terminals 11, the POS server 12, and the display control apparatus 13 are connected to the communication network 15. The attendant terminal 14 is connected to the display control apparatus 13. The communication network 15 is typically a LAN (Local Area Network). The LAN may be a wired LAN or may be a wireless LAN.

The self-service POS terminal 11 is a settlement terminal that allows a customer to perform registration and settlement operations for purchasing commodities by himself or herself. Hereinafter the customer may be referred to as the operator of the POS terminal 11. The POS server 12 is a server computer for centrally controlling operations of the self-service POS terminals 11. The display control apparatus 13 is a controller that generates a separate monitoring image SC (see FIG. 3) for each of the self-service POS terminals 11. Each monitoring image SC is based on data signals output from the self-service POS terminals 11. The display control apparatus 13 causes a display device of the attendant terminal 14 to display the monitoring image(s) SC. The attendant terminal 14 is a terminal for a store clerk (called an attendant in this context) to use to monitor operations of the self-service POS terminals 11. The display device of the attendant terminal 14 can be a display such as a liquid crystal display or an organic EL (electro-luminescence) display. The display screen of the attendant terminal 14 can be divided into separate regions or sections, each of which displays a different monitoring image SC for a different POS terminal 11. In general, the self-service POS terminal 11 may be a conventional self-service POS system.

The information processing system 200 includes a plurality of cameras 21 and an information processing apparatus 22. Each of the plurality of cameras 21 is associated with a corresponding one of the plurality of self-service POS terminals 11. The camera 21 is a camera for imaging a customer who performs operation on the self-service POS terminal 11 corresponding to the camera.

The information processing apparatus 22 includes various functions as an action recognizing unit 221, an operation recognizing unit 222, a determining unit 223, and an informing unit 224. The action recognizing unit 221 has a function of recognizing, based on image data output from the cameras 21, actions of customers who perform operation on the self-service POS terminals 11. The operation on the self-service POS terminals 11 is clarified in the explanation below. The operation recognizing unit 222 has a function of recognizing, based on the data for the monitoring image SC from the display control apparatus 13 for the attendant terminal 14, the operation on the self-service POS terminals 11 by the customers. The determining unit 223 has a function of determining, based on a recognition result by the action recognizing unit 221 and a recognition result by the operation recognizing unit 222, presence or absence of an abnormal action by a customer on a commodity for which commodity registration operation is recognized. The informing unit 224 has a function of, if presence of an abnormal action of the customer is determined by the determining unit 223, informing that the action of the customer is abnormal. For example, the attendant terminal 14 informs the abnormal action to the attendant.

Figure 2:
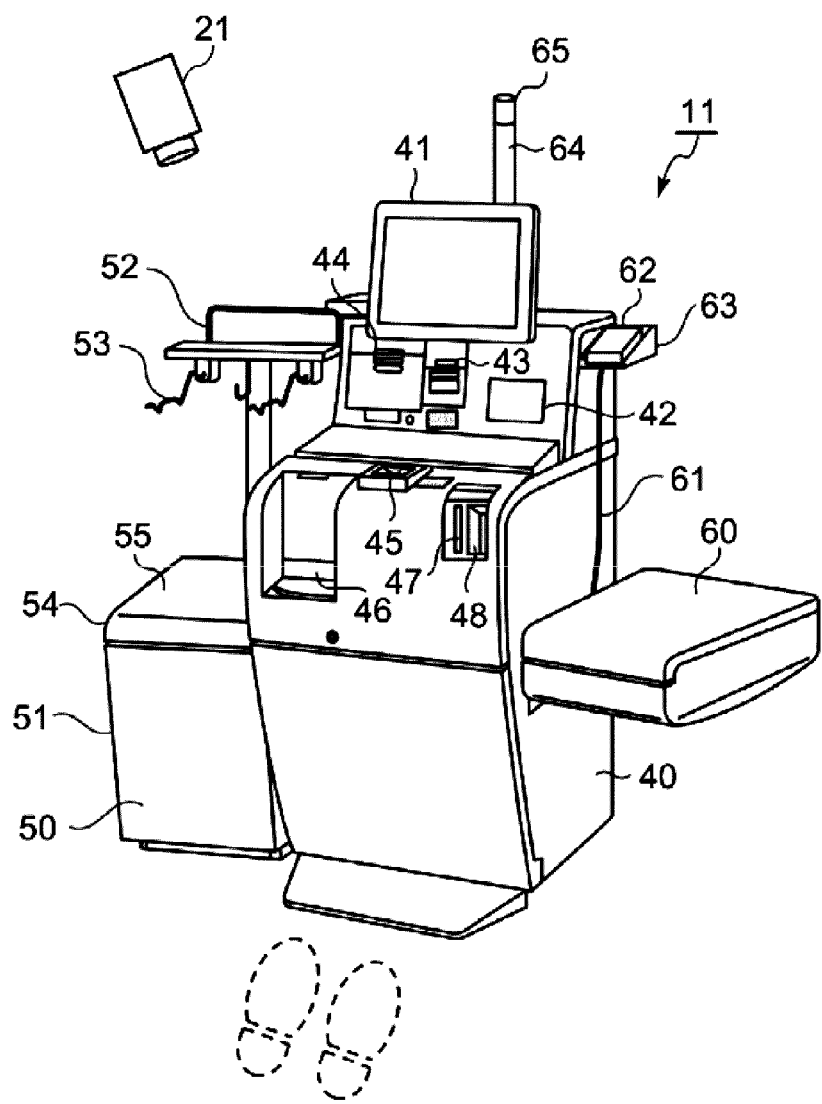
FIG. 2 is a diagram of a self-service POS terminal and a camera.

FIG. 2 is a diagram of the self-service POS terminal 11 and the camera 21. First, an exterior configuration of the self-service POS terminal 11 is explained.

The self-service POS terminal 11 includes a main body 40 set on a floor surface and a scale unit 51 set beside the main body 40. A touch panel 41 is attached to an upper part of the main body 40. The touch panel 41 includes a display and a touch sensor. The display is a device for displaying various screens to an operator, that is, a customer who operates the self-service POS terminal 11. The touch sensor is a device for detecting a touch input to a screen by the customer.

In the main body 40, a basket table 60 is provided on the opposite side of a side where the scale unit 51 is set. The basket table 60 is a table for a customer coming from a selling floor to place a basket or the like including commodities to be purchased. The customer stands on a near side of the main body 40 in FIG. 2 and performs registration operations while viewing the screen of the touch panel 41. Therefore, when viewed from the customer side, the basket table 60 is on the right side of the main body 40 and the scale unit 51 is on the left side of the main body 40. In the following explanation, the side at which the customer stands is referred to as the front side of the main body 40, the side where the scale unit 51 is set is referred to as the left side of the main body 40, and the side where the basket table 60 is provided is referred to as the right side of the main body 40.

A scanner reading window 42, a card insertion port 43, a receipt dispensing port 44, a coin depositing port 45, a coin dispensing port 46, a bill depositing port 47, and a bill dispensing port 48 are formed on the front surface of the main body 40. A communication cable 61 extends from the right side surface of the main body 40 to the outside. A reader writer 62 for an electronic money medium is connected to the distal end of the communication cable 61. The reader writer 62 is placed on a placing table 63 provided in an upper right part of the main body 40.

A display pole 64 is attached to the upper surface of the main body 40. The display pole 64 includes, at the distal end portion thereof, a light emitting unit 65 that selectively emits, for example, blue light and red light. The display pole 64 displays, with light emission colors of the light emitting unit 65, states of the self-service POS terminal 11, for example, standby, operating, calling, and error.

A scale pan 54 is provided in an upper part of a housing 50 of the scale unit 51. A bag holder 52 is attached to an upper part of the scale pan 54. The upper surface of the scale pan 54 is a placing surface 55. The bag holder 52 includes a pair of holding arms 53. A bag provided by a store or a shopping bag (e.g., a reusable shopping bag) carried by the customer is held by the holding arms 53.

The scale unit 51 measures the weight of commodities put in the bag or the reusable shopping bag held by the holding arms 53 and placed on the placing surface 55.

A positional relation between the self-service POS terminal 11 and the camera 21 is explained.

As illustrated in FIG. 2, the camera 21 is set in a position where the camera 21 is capable of imaging, from above, a customer who stands in the front of the self-service POS terminal 11 and faces components such as the main body 40, the scale unit 51, and the basket table 60.

First, the customer standing in the front of the self-service POS terminal 11 places a basket or the like on the basket table 60 and causes the holding arms 53 on the left side to hold a bag, a reusable shopping bag, or the like. Next, the customer operates the touch panel 41 and declares a start of use of the self-service POS terminal 11 according to guidance displayed on the touch panel 41.

Thereafter, the customer picks up the commodities one by one from the basket on the basket table 60. If a barcode is attached to the commodity, the customer holds the barcode to the reading window 42 and a scanner reads the barcode to perform commodity registration. If a barcode is not attached to the commodity, the customer operates the touch panel 41 to select the commodity being purchased from a list of commodities without barcodes to perform commodity registration. The customer puts the registered commodity in the bag provided by the store, the reusable shopping bag owned by the customer, or the like.

The customer who has finished registering all the commodities to be purchased operates the touch panel 41 and selects a settlement method. For example, after selecting cash settlement, the customer deposits bills or coins in the bill depositing port 47 or the coin depositing port 45 and then takes out the change dispensed from the bill dispensing port 48 or the coin dispensing port 46. For example, after selecting electronic money settlement, the customer holds an electronic money medium over the reader writer 62. For example, after selecting credit card settlement, the customer inserts a credit card into the card insertion port 43. After finishing the settlement in this way, the customer receives a receipt dispensed from the receipt dispensing port 44, takes the bag provided by the store or the reusable shopping bag from the holding arms 53, and leaves the store.

FIG. 3 is a schematic diagram illustrating an example of the monitoring image SC displayed on the display of the attendant terminal 14. The monitoring image SC is updated according to the operations performed on the self-service POS terminal 11. As explained above, the monitoring image SC for each of the plurality of self-service POS terminal 11 can be displayed on the display of the attendant terminal 14. FIG. 3 is an example of the monitoring image SC for one self-service POS terminal 11 among the plurality of self-service POS terminals 11. Since the configuration of monitoring images SC for the other self-service POS terminals 11 is the same as the monitoring image SC, explanation of the other monitoring images SC is omitted.

As illustrated in FIG. 3, the monitoring image SC includes a register number field 71, a terminal state field 72, an error information field 73, a declaration information field 74, a details field 75, and a payment field 76.

The register number field 71 is a field for displaying a register number. Register numbers are a series of numbers uniquely allocated to the self-service POS terminals 11 to identify the self-service POS terminals 11. That is, the register numbers are identification information for identifying the self-service POS terminals 11.

The terminal state field 72 is a field for displaying an operation state of the self-service POS terminal 11. In this embodiment, any one of "standby," "use started," "registering," "settlement started," and "settling" is displayed in the terminal state field 72 as the operation state.

The "standby" is a state from when the preceding customer has finished settlement until when a use start of the next customer is declared. An initial image is displayed on the touch panel 41 of the self-service POS terminal 11 that is in the state of "standby." The initial image is an image including a touch button for causing a customer to select, for example, whether to use a bag provided by the store or use a reusable shopping bag. If the operation state of the self-service POS terminal 11 is "use started," "registering," or "settlement started," the operation state of the self-service POS terminal 11 returns to "standby" if a set time elapses without operation on the self-service POS terminal 11 being recognized. The set time is, for example, thirty seconds or one minute. The setting time can be optionally set.

The state "use started" is a state in which the customer standing in the front of the self-service POS terminal 11 declares a use start for settlement. The customer performs, on the initial image, selection operation for selecting whether to use a bag provided by the store or use a reusable shopping bag. The selection operation is the declaration of the use start. In response to the selection operation, the operation state of the self-service POS terminal 11 changes to "use started."

The "registering" is a state in which registration operations for commodities is received. Once the first commodity is registered, the operation state of the self-service POS terminal 11 changes to "registering." Thereafter, the operation state of the self-service POS terminal 11 maintains the state "registering" until a shift to settlement is declared. For example, a softkey of "registration stop" is displayed on the touch panel 41 of the self-service POS terminal 11 while in the state of "registering." The customer stopping the registration of commodities touches the softkey of "registration stop." In response to the stop operation, the operation state of the self-service POS terminal 11 returns to the "standby."

The "settlement started" is a state in which the customer who has finished the registration of the commodities being purchased declares a shift (changeover) to settlement. A softkey of "checkout" is displayed on the touch panel 41 of the self-service POS terminal 11 that is in the state of the "registering." The customer who has finished the registration touches the softkey of "checkout." This operation is declaration of a shift to settlement. In response to this operation, the operation state of the self-service POS terminal 11 changes to the "settlement started." For example, a softkey of "settlement stop" is displayed on the touch panel 41 of the self-service POS terminal 11 after the state changes to "settlement started." The customer who wants to stop the settlement touches the softkey of "settlement stop." In response to the stop operation, the operation state of the self-service POS terminal 11 returns to "standby."

The state "settling" is a state in which settlement processing (such as cash settlement, electronic money settlement, or credit card settlement) can be executed. For example, if bills or coins are paid through the bill depositing port 47 or the coin depositing port 45, the operation state of the self-service POS terminal 11 changes to "settling." If the settlement processing is finished, the operation state of the self-service POS terminal 11 returns to "standby."

The error information field 73 is a field for displaying information concerning an error that occurs in the self-service POS terminal 11. The error is, for example, a communication error or a no receipt paper error. The declaration information field 74 is a field for displaying declaration operation content of the customer. For example, if the customer selects the reusable shopping bag, "bag unnecessary" indicating that a bag is unnecessary is displayed.

The details field 75 is a field for displaying detailed information of the commodities registered at the self-service POS terminal 11. The detailed information includes, for example, a commodity name, the number of commodities, a price, and the like of each of the purchased commodities. The payment field 76 is a field for displaying payment information for the purchased commodities registered at the self-service POS terminal 11. The payment information includes, for example, a total number of the purchased commodities, a total payment amount due, a deposited amount, and a change due amount.

The configuration of the monitoring image SC is not limited to the example shown in FIG. 3. Other fields may be arranged in the monitoring image SC. The text displayed in the monitoring image SC is not limited to the example shown in FIG. 3. Any text may be displayed in the monitoring image SC.

Figure 4:
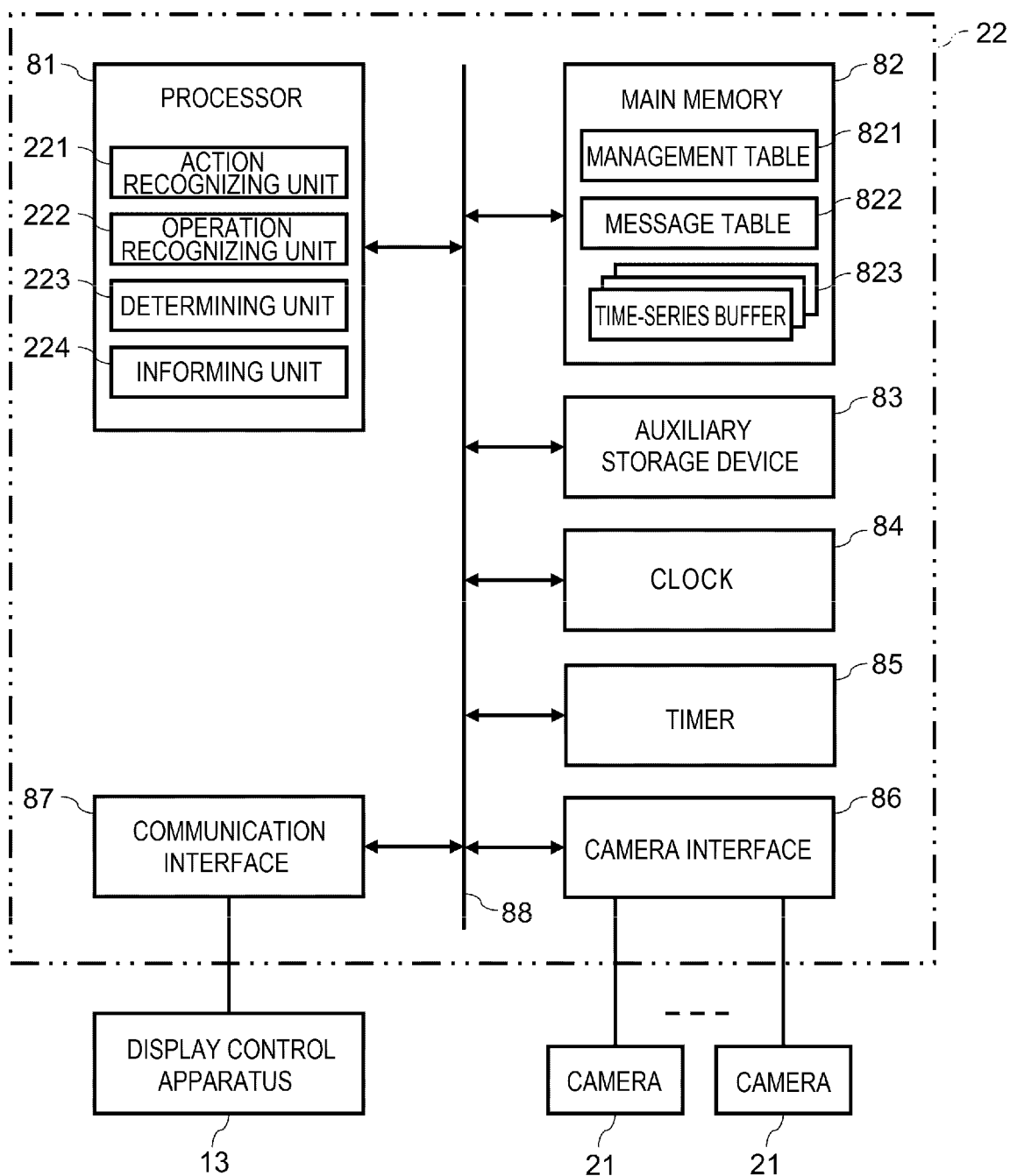
FIG. 4 is a hardware block diagram illustrating an information processing apparatus.

FIG. 4 is a hardware block diagram of the information processing apparatus 22. The information processing apparatus 22 includes a processor 81, a main memory 82, an auxiliary storage device 83, a clock 84, a timer 85, a camera interface 86, a communication interface 87, and a system bus 88. The system bus 88 includes an address bus and a data bus. The processor 81, the main memory 82, the auxiliary storage device 83, the clock 84, the timer 85, the camera interface 86, and the communication interface 87 are connected by the system bus 88.

The processor 81 performs various functions of the information processing apparatus 22 according to an operating system or application programs. The processor 81 is, for example, a CPU (Central Processing Unit).

The main memory 82 includes a nonvolatile memory region and a volatile memory region. The nonvolatile memory region of the main memory 82 stores the operating system or the application programs. The volatile memory region of the main memory 82 stores data necessary for the processor 81 in executing various functions. The data of this type may be stored in the nonvolatile memory region. The volatile memory region is used as a work area where data is rewritten as appropriate by the processor 81. The nonvolatile memory region is, for example, a ROM (Read Only Memory). The volatile memory region is, for example, a RAM (Random Access Memory).

The auxiliary storage device 83 is a well-known storage device such as an SSD (Solid State Drive), an HDD (Hard Disc Drive), or an EEPROM® (Electric Erasable Programmable Read-Only Memory) or a combination thereof. The auxiliary storage device 83 stores data used by the processor 81 in performing various kinds of processing, data generated during the processing by the processor 81, and the like. The auxiliary storage device 83 may store the application programs.

The application programs stored by the main memory 82 or the auxiliary storage device 83 include a control program explained below. A method of installing the control program in the main memory 82 or the auxiliary storage device 83 is not particularly limited. The control program can be installed in the main memory 82 or the auxiliary storage device 83 from a removable recording medium or by communication via a network. A form of the recording medium may be any form if the recording medium can store programs like a CD-ROM or a memory card and can be read by the information processing apparatus 22.

The clock 84 functions as a time information source of the information processing apparatus 22. The processor 81 acquires present date and time based on time information clocked by the clock 84.

The timer 85 clocks a set time according to the control by the processor 81.

The camera interface 86 is an interface circuit for communicating with the cameras 21. Imaging data output from the cameras 21 are taken into the information processing apparatus 22 via the camera interface 86. The imaging data are data obtained by imaging customers who operate the self-service POS terminals 11 corresponding to the cameras 21.

The communication interface 87 is a network interface circuit for communicating with the display control apparatus 13. Image data output from the display control apparatus 13 is taken into the information processing apparatus 22 via the communication interface 87. The image data is data of the monitoring image SC generated for each of the self-service POS terminals 11.

Figure 5:
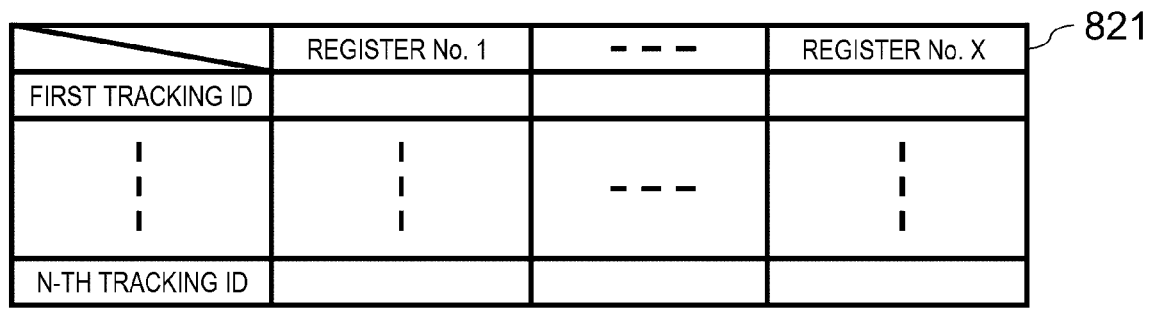
FIG. 5 depicts a data structure of a management table.
Figure 6:
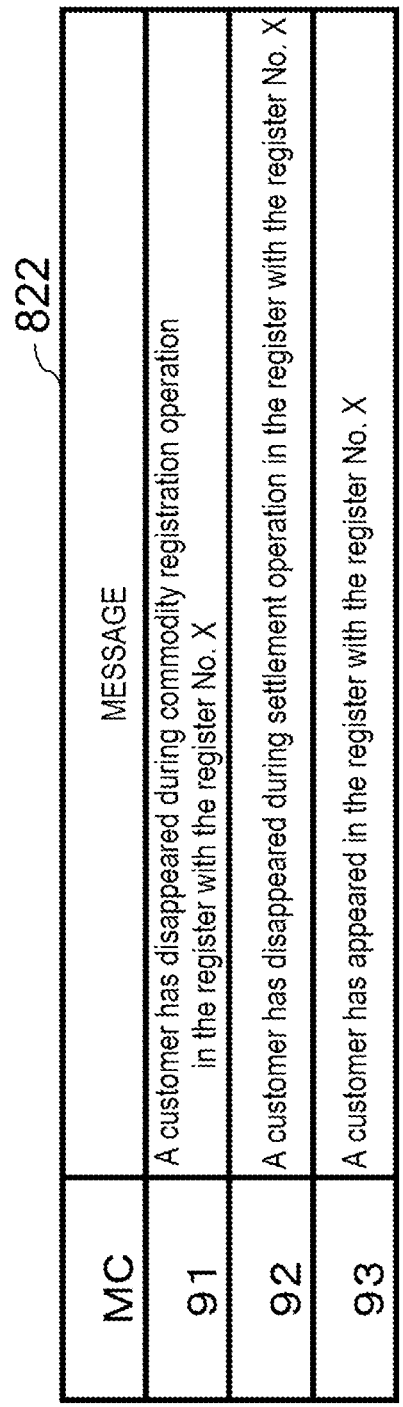
FIG. 6 depicts a data structure of a message table.

The information processing apparatus 22 having such a configuration uses a part of the volatile memory region in the main memory 82 to store a management table 821 (see FIG. 5) and a message table 822 (see FIG. 6). The information processing apparatus 22 generates and store data of the management table 821 and the message table 822 in this region.

FIG. 5 depicts a data structure of the management table 821. As illustrated in FIG. 5, the management table 821 includes a region for describing one or more tracking IDs in association with the register number of each of the self-service POS terminals 11. The tracking ID is identification information for, if it is detected that a person stands in the front of the self-service POS terminal 11, temporarily identifying the person as a tracking target person. The management table 821 is not limited to data of the items explained above.

FIG. 6 depicts a data structure of the message table 822. As illustrated in FIG. 6, the message table 822 is a data table in which text data of a message is described in correlation with a message code MC. The message code MC and the text data of the message correlated with the message code MC are clarified in explanation below.

Figure 7:
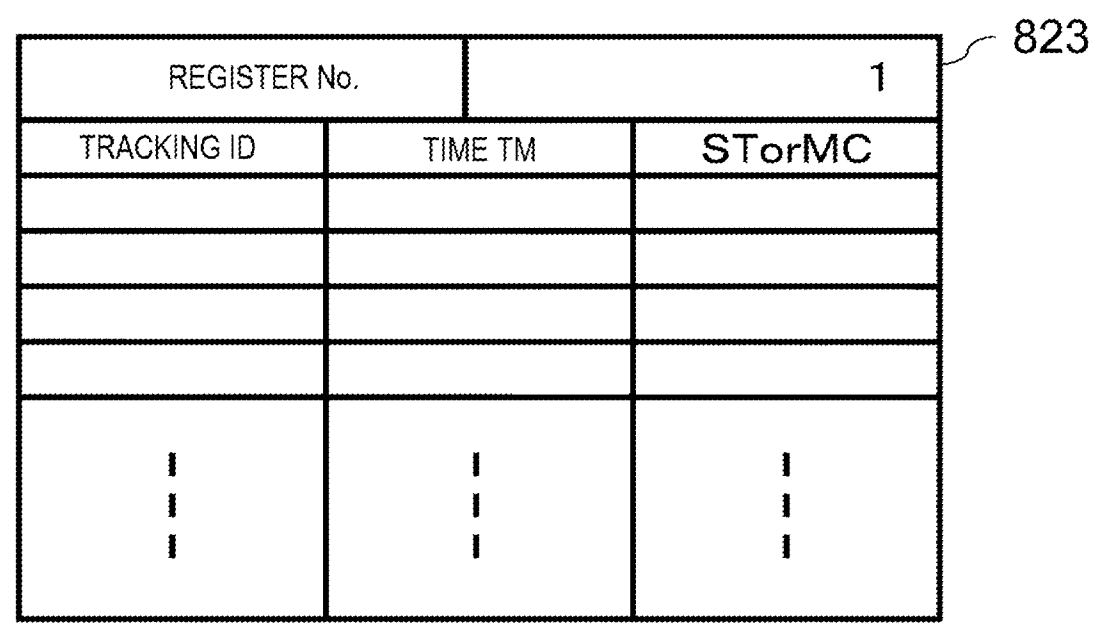

The information processing apparatus 22 uses a part of the volatile memory region in the main memory 82 to store time-series data 823 (see FIG. 7). The information processing apparatus 22 generates and stores the time-series data 823 for each of the self-service POS terminals 11 in this region.

FIG. 7 depicts a data structure of the time-series data 823. As illustrated in FIG. 7, the time-series data 823 includes regions for describing a tracking ID, time TM, and a status ST or a message code MC for each of the register numbers for identifying the self-service POS terminals 11. The status ST or the message code MC are described in the time-series data 823 in ascending order of the time TM. The status ST is clarified in explanation below.

As explained above, the processor 81 of the information processing apparatus 22 performs, according to the control program, the functions of the action recognizing unit 221, the operation recognizing unit 222, the determining unit 223, and the informing unit 224 explained above.

The functions of the action recognizing unit 221, the operation recognizing unit 222, the determining unit 223, and the informing unit 224 are performed for each of the self-service POS terminals 11. Therefore, in the following explanation, the functions of the action recognizing unit 221, the operation recognizing unit 222, the determining unit 223, and the informing unit 224 for one particular self-service POS terminal 11 are explained in detail. Since the functions of the action recognizing unit 221, the operation recognizing unit 222, the determining unit 223, and the informing unit 224 for the other self-service POS terminals 11 are the same, explanation of the functions is omitted.

Figure 8:
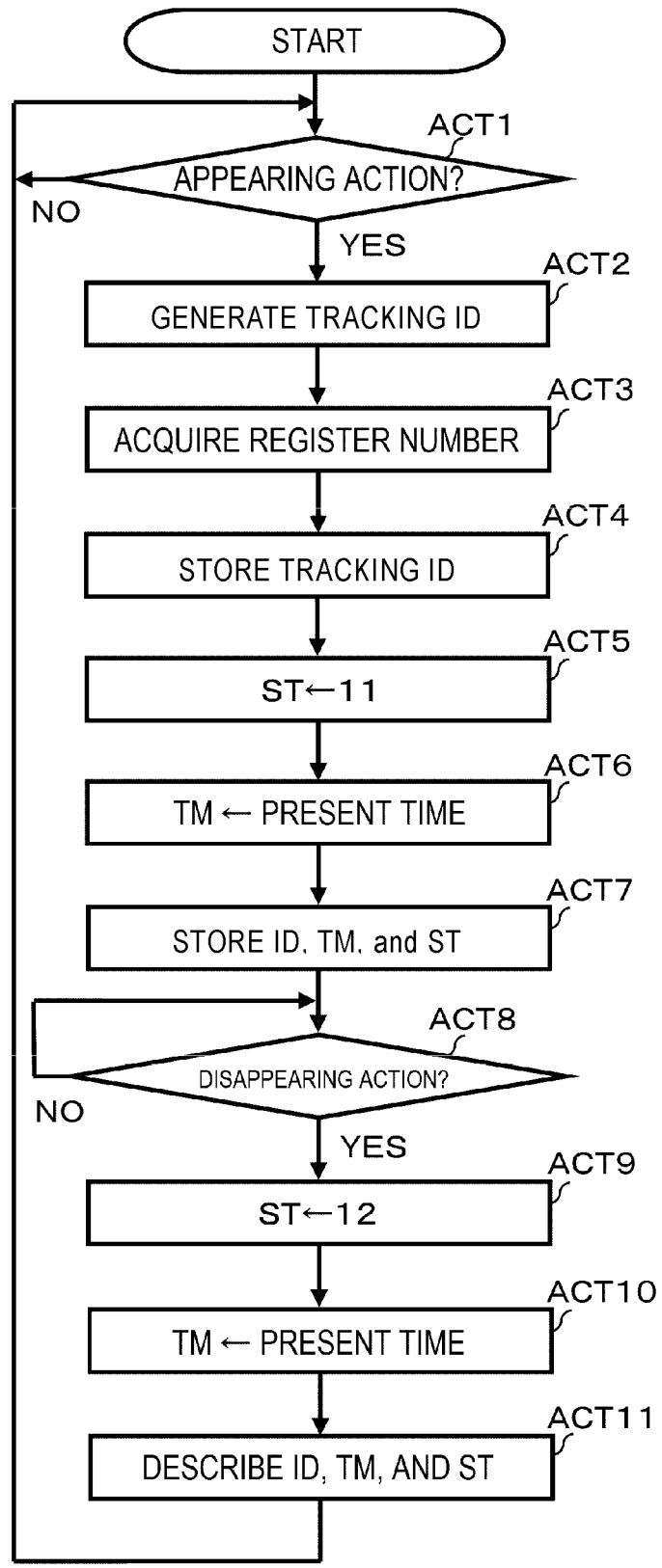
FIG. 8 is a flowchart of a function of an action recognizing unit.

FIG. 8 is a flowchart of the function of the action recognizing unit 221.

In ACT 1, the processor 81 waits for an appearing action to be recognized or detected. In this context, an "appearing action" is the customer showing up at the self-service POS terminal 11. If it is detected from imaging data of a camera 21 that a person is now standing in the front of the self-service POS terminal 11, the processor 81 recognizes that an appearing action has been performed. The customer can be detected in the imaging data from a camera 21, for example, when the customer begins to perform registration and settlement operations using the self-service POS terminal 11 or if a customer who went back to the selling floor to pick up a commodity that the customer forgot returns to the self-service POS terminal 11.

If recognizing the appearing action of the customer, the processor 81 determines YES in ACT 1 and proceeds to ACT 2. In ACT 2, the processor 81 generates a tracking ID for the customer.

In ACT 3, the processor 81 acquires the register number of the self-service POS terminal 11. As described above, the cameras 21 are provided to correspond to the self-service POS terminals 11 in a one-to-one relation. Therefore, the processor 81 may identify the particular self-service POS terminal 11 from identification information of the camera 21 that has imaged the customer standing in the front of the self-service POS terminal 11 and thus acquires the register number of the self-service POS terminal 11 accordingly.

In ACT 4, the processor 81 stores the tracking ID generated in the processing of ACT 2 in the management table 821 of the main memory 82 in association with the register number of the self-service POS terminal 11 acquired in the processing of ACT 3.

In ACT 5, the processor 81 sets the status ST to "11." That is, if an appearing action at the self-service POS terminal 11 is recognized by the action recognizing unit 221, the processor 81 sets the status ST to "11." In ACT 6, the processor 81 acquires the present time TM provided by the clock 84. In ACT 7, the processor 81 stores the tracking ID generated in the processing in ACT 2, the time TM, and the status ST in correlation with one another in the time-series data 823 for which the register number acquired in the processing in ACT 3 is set.

In ACT 8, the processor 81 waits for a disappearing action of the customer to be recognized or detected. In this context, a disappearing action is the customer going away from (leaving) the self-service POS terminal 11. If a customer cannot be detected in the imaging data of the camera 21, the processor 81 recognizes that the customer has left the self-service POS terminal (a disappearing action has been performed). The customer cannot be detected in the imaging data of the camera 21 if the customer walks away from the self-service POS terminal 11 with purchased commodities for which settlement is not completed, if the customer who completed settlement walks away from the self-service POS terminal 11 in order to leave the store, if the customer walks away from the self-service POS terminal 11 in order to go back to the selling floor to pick up a commodity that the customer previously forgot to pick up, or if the customer performs the stop operation and then walks away from the self-service POS terminal 11.

If recognizing the disappearing action, the processor 81 determines YES in ACT 8 and proceeds to ACT 9. In ACT 9, the processor 81 sets the status ST to "12." That is, if the disappearing action from the self-service POS terminal 11 is recognized by the action recognizing unit 221, the processor 81 sets the status ST to "12."

In ACT 10, the processor 81 acquires the present time TM from the clock 84. In ACT 11, the processor 81 stores the tracking ID generated in the processing in ACT 2, the time TM, and the status ST in correlation with one another in the time-series data 823 for which the register number acquired in the processing in ACT 3 is set. The processor 81 returns to ACT 1 to wait for a customer to be detected again in the imaging data of the camera 21 standing in the front of the self-service POS terminal 11. Once another "appearing action" is recognized, processor 81 executes the processing in ACT 2 to ACT 11 in the same manner as explained above. The functioning of the action recognizing unit 221 is as explained above.

Figure 9:
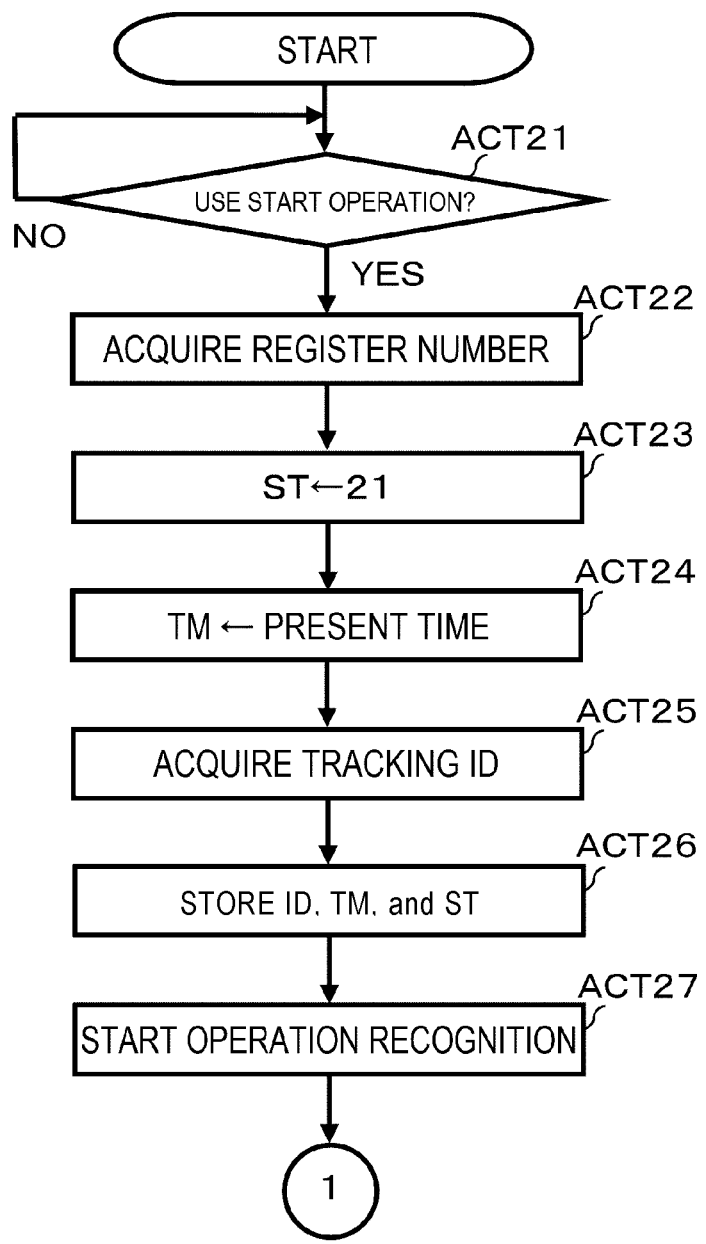
FIGS. 9 and 10 are flowcharts of a function of an operation recognizing unit.

FIG. 9 is a flowchart of the function of the operation recognizing unit 222.

In ACT 21, the processor 81 waits for a use start to be declared for the self-service POS terminal 11. If the use start is declared, the "use started" will be displayed in the terminal state field 72 of the monitoring image SC corresponding to the self-service POS terminal 11. The processor 81 thus checks whether the characters of "use started" are in the terminal state field 72 of the particular monitoring image SC supplied via the display control apparatus 13. If the characters of "use started" are present, the processor 81 recognizes that the use start has been declared.

After recognizing that the use start is declared, the processor 81 determines YES in ACT 21 and proceeds to ACT 22. In ACT 22, the processor 81 acquires the register number (register ID) of the self-service POS terminal 11. The register number is displayed in the register number field 71 of the corresponding monitoring image SC. The processor 81 acquires the register number via the display control apparatus 13.

In ACT 23, the processor 81 sets the status ST to "21." In ACT 24, the processor 81 acquires the present time TM clocked by the clock 84.

In ACT 25, the processor 81 acquires the tracking ID with reference to the management table 821. Specifically, the processor 81 acquires, with reference to the management table 821, the latest tracking ID stored in association with the register number acquired in ACT 22. If one tracking ID associated with the register number is present, the latest tracking ID is that tracking ID. Specific processing in ACT 38, ACT 42, and ACT 47 in FIG. 10 explained below is the same as the processing in ACT 25.

In ACT 26, the processor 81 stores the tracking ID acquired in the processing in ACT 25, the time TM, and the status ST in correlation with one another in the time-series data 823 in which the register number acquired in the processing in ACT 22 is set.

Therefore, if the customer standing in the front of the self-service POS terminal 11 performs declaration operation for a use start, first, "21" is described as the status ST together with the time TM and the tracking ID in the time-series data 823 corresponding to the self-service POS terminal 11.

In ACT 27, the processor 81 starts operation recognition for detecting which operation is presently being performed at the self-service POS terminal 11. Specifically, the processor 81 recognizes operations such as a commodity registration operation, a settlement start operation, a stop operation, or a settlement end operation based on changes in the monitoring image SC generated by the display control apparatus 13 for the attendant terminal 14. The operations can be recognized by processor 81 based on information acquired by character recognition or the like on the monitoring image SC (or particular fields thereof). Such information can be acquired by processor 81 via the display control apparatus 13 or by evaluation of the monitoring image SC data supplied to the processor 81 from the display control apparatus 13.

For example, if detailed information such as a commodity name, the number of commodities, and a price thereof is added to the details field 75 of the monitoring image SC, the processor 81 can recognize that the commodity registration operation is being performed. If the terminal state field 72 is switched to the "settlement started," the processor 81 can recognize that the settlement start operation was performed. If the terminal state field 72 is switched from the "registering" to the "standby," the processor 81 can recognize that the stop operation was performed. If the terminal state field 72 is switched from the "settlement started" to the "standby," the processor 81 can recognize that the stop operation was performed. If the terminal state field 72 is switched from the "settling" to the "standby," the processor 81 can recognize that the settlement end operation was performed.

Figure 10:
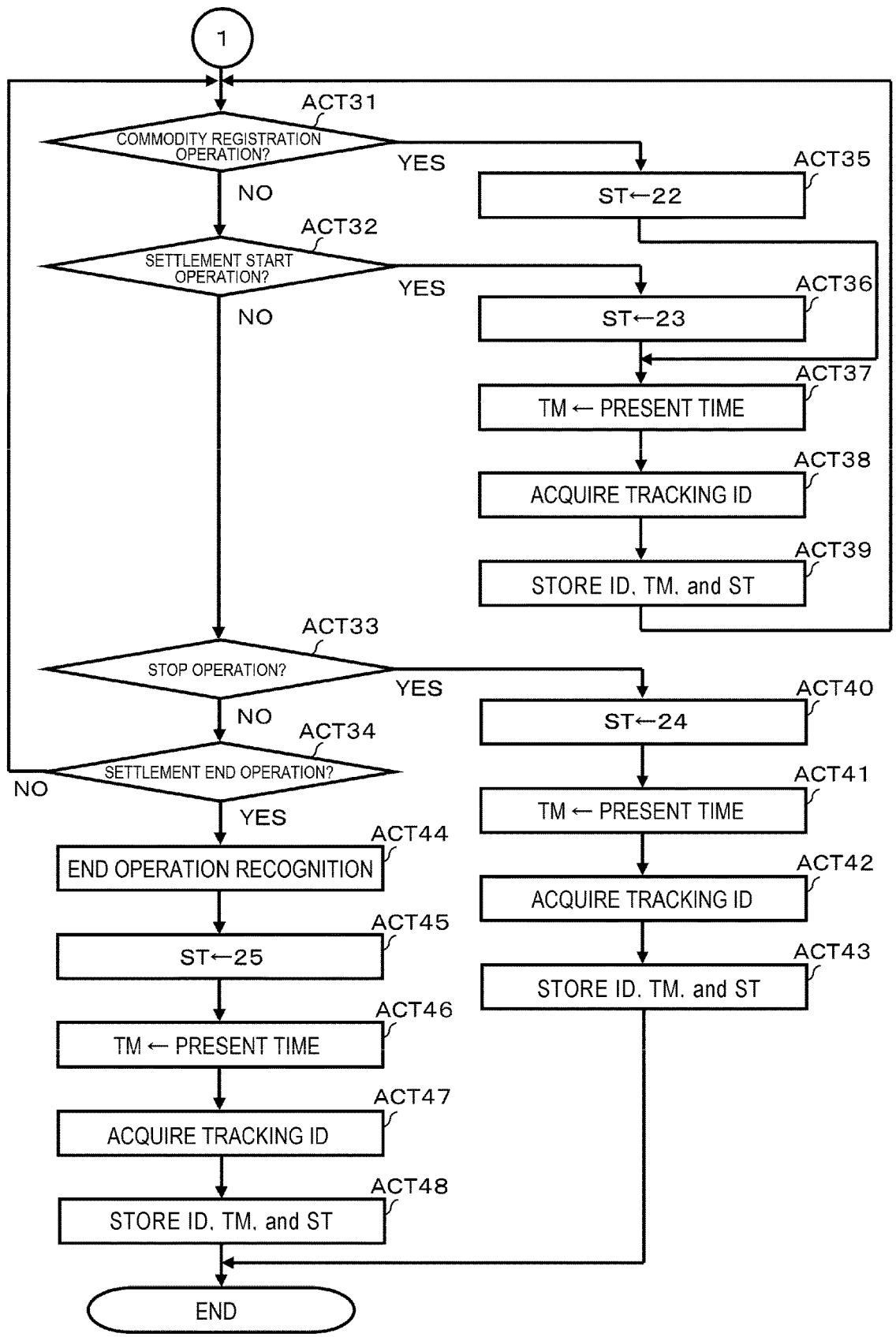

In ACT 31 to ACT 34 in FIG. 10, the processor 81 waits for one of the commodity registration operations, the settlement start operation, the stop operation, or the settlement end operation to be recognized.

If recognizing the commodity registration operation while in the waiting state in ACT 31 to ACT 34, the processor 81 determines YES in ACT 31 and proceeds to ACT 35. In ACT 35, the processor 81 sets the status ST to "22." That is, if the commodity registration operation for the self-service POS terminal 11 is recognized by the operation recognizing unit 222, the processor 81 sets the status ST to "22."

In the waiting state in ACT 31 to ACT 34, if recognizing the settlement start operation, the processor 81 determines YES in ACT 32 and proceeds to ACT 36. In ACT 36, the processor 81 sets the status ST to "23." That is, if the settlement start operation for the self-service POS terminal 11 is recognized by the operation recognizing unit 222, the processor 81 sets the status ST to "23."

After finishing the processing in ACT 35 or ACT 36, the processor 81 proceeds to ACT 37. In ACT 37, the processor 81 acquires the present time TM from the clock 84.

In ACT 38, the processor 81 acquires the tracking ID by reference to the management table 821. In ACT 39, the processor 81 stores the tracking ID acquired in the processing in ACT 38, the time TM, and the status ST in correlation with one another in the time-series data 823 for which the register number acquired in the processing in ACT 22 in FIG. 9 is set. The processor 81 returns to the waiting state of ACT 31 to ACT 34.

In the waiting state of ACT 31 to ACT 34, upon recognizing the stop operation, the processor 81 determines YES in ACT 33 and proceeds to ACT 40. In ACT 40, the processor 81 sets the status ST to "24." That is, if the stop operation for the self-service POS terminal 11 is recognized by the operation recognizing unit 222, the processor 81 sets the status ST to "24."

In ACT 41, the processor 81 acquires the present time TM from the clock 84. In ACT 42, the processor 81 acquires the tracking ID with reference to the management table 821. In ACT 43, the processor 81 stores the tracking ID acquired in the processing in ACT 42, the time TM, and the status ST in correlation with one another in the time-series data 823 in which the register number acquired in the processing in ACT 22 in FIG. 9 is set. Then, the processor 81 ends the functioning of the operation recognizing unit 222.

In the waiting state of ACT 31 to ACT 34, if the settlement end operation is recognized, the processor 81 determines YES in ACT 34 and proceeds to ACT 44. In ACT 44, the processor 81 ends the operation recognition for the self-service POS terminal 11.

In ACT 45, the processor 81 sets the status ST to "25". That is, because the settlement end operation for the self-service POS terminal 11 was recognized (YES, ACT 34) by the operation recognizing unit 222 and operation recognition was ended (ACT 44), the processor 81 sets the status ST to "25."

In ACT 46, the processor 81 acquires the present time TM from the clock 84. In ACT 47, the processor 81 acquires the tracking ID by reference to the management table 821. In ACT 48, the processor 81 stores the tracking ID (acquired in the processing in ACT 47), the time TM, and the status ST in correlation with one another in the time-series data 823 for which the register number acquired in the processing in ACT 22 in FIG. 9 is set. Then, processor 81 then ends the functioning of the operation recognizing unit 222.

Usually, the customer performs operations at the self-service POS terminal 1 in the standard order of use start operation, then commodity registration operation, then settlement start operation, and then settlement end operation. Therefore, the status ST is normally described in the time-series data 823 in the order of "21," 22," "23," and "25."

However, a customer stopping the registration of the commodities before settlement performs operations in the order of use start operation, then commodity registration operation, and then stop operation. Therefore, the status ST is described in the time-series data 823 in the order of "21," "22," and "24."

A customer stopping the settlement of the commodities before completion performs operations in the order of use start operation, then commodity registration operation, then settlement start operation, and then stop operation. Therefore, the status ST is described in the time-series data 823 in the order of "21," "22," "23," and "24."

The functioning of the operation recognizing unit 222 in this context is as already explained above. Upon detecting the start use operation for the self-service POS terminal 11 from the data for the monitoring image SC, the processor 81 executes the processing in ACT 22 to ACT 27 in FIG. 9 and ACT 31 to ACT 48 in FIG. 10 in the same manner as explained above.

Figure 11:
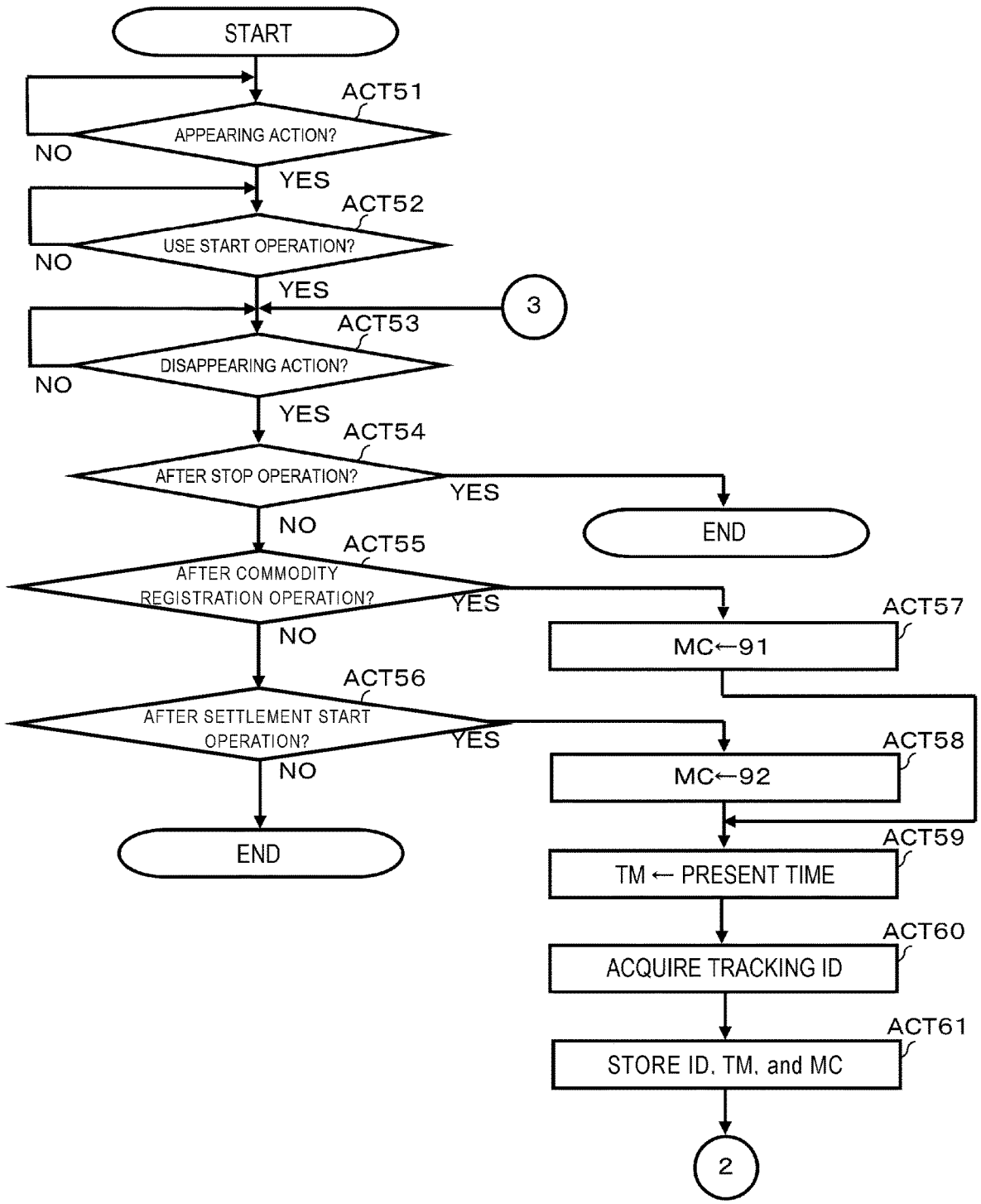
FIGS. 11 and 12 are flowcharts of a function of a determining unit.
Figure 12:
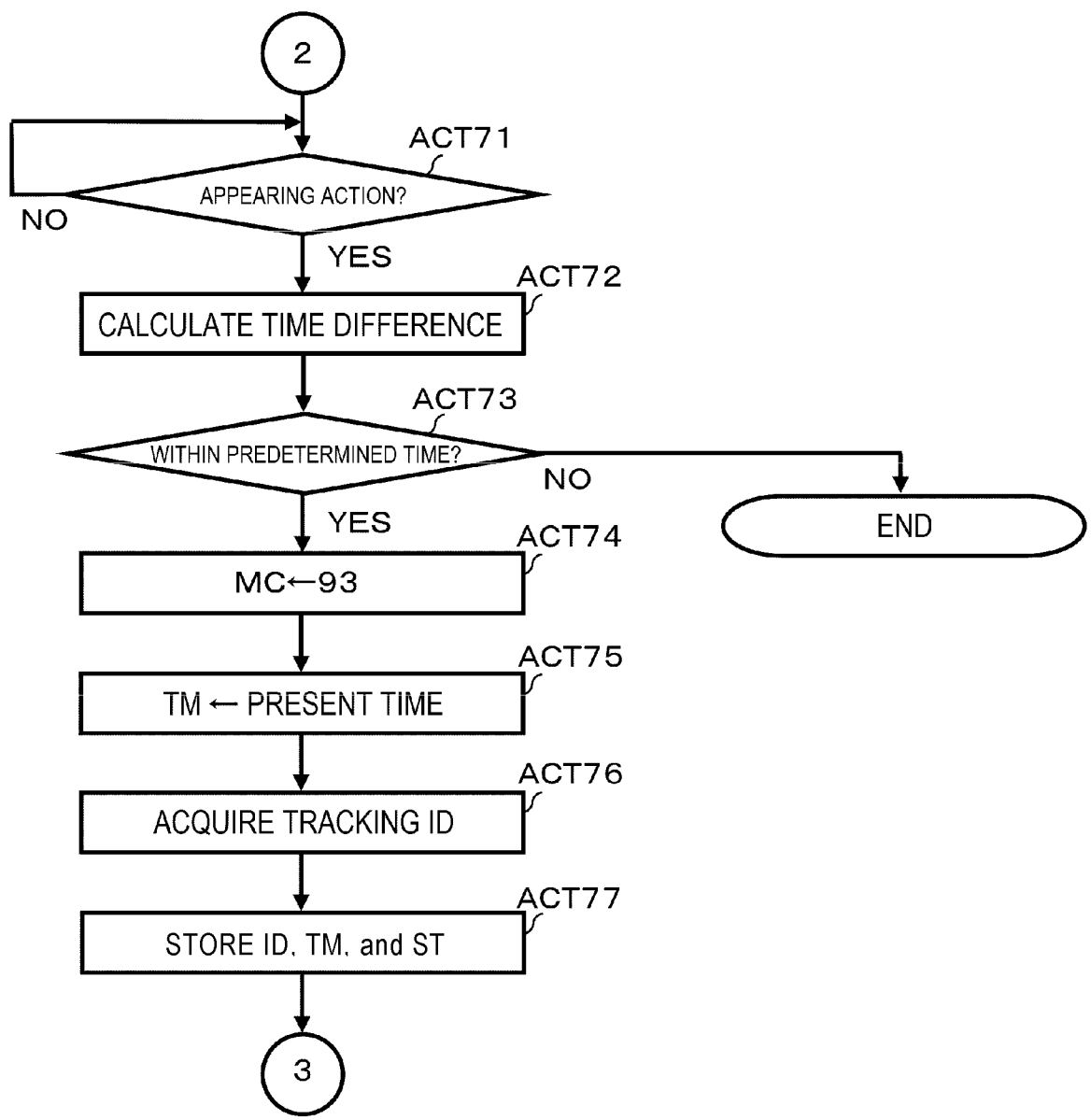

FIGS. 11 and 12 are flowcharts of the functioning of the determining unit 223.

In ACT 51, the processor 81 checks whether an appearing action was recognized by the action recognizing unit 221. If the appearing action was recognized, "11" will be stored as the status ST in the time-series data 823. If "11" is stored as the status ST in the time-series data 823, the processor 81 determines YES in ACT 51 and proceeds to ACT 52.

In ACT 52, the processor 81 checks whether the use start operation was recognized by the operation recognizing unit 222. If the use start operation was performed on the self-service POS terminal 11, "21" will be stored as the status ST in the time-series data 823 in which the register number of the self-service POS terminal 11 is set. After "21" is stored as the status ST in the time-series data 823, the processor 81 determines YES in ACT 52 and proceeds to ACT 53.

In ACT 53, the processor 81 checks whether a disappearing action was recognized by the action recognizing unit 221. If the disappearing action was recognized, "12" will be stored as the status ST in the time-series data 823. Therefore, if "12" is stored as the status ST in the time-series data 823, the processor 81 determines YES in ACT 53 and proceeds to ACT 54.

In ACT 54, the processor 81 checks whether the disappearing action occurred after the stop operation was recognized. If the stop operation was performed on the self-service POS terminal 11, "24" will be stored as the status ST in the time-series data 823. Therefore, if "24" is stored as the status ST in the time-series data 823 in correlation with the time TM immediately preceding the time TM at which "12" was stored as the status ST, the processor 81 determines that the disappearing action was after the stop operation.

If the disappearing action is not after a stop operation, the processor 81 determines NO in ACT 54 and proceeds to ACT 55. In ACT 55, the processor 81 checks whether the disappearing action was after a commodity registration operation. If the commodity registration operation was performed on the self-service POS terminal 11, "22" will be stored as the status ST in the time-series data 823. Therefore, if "22" is stored as the status ST in the time-series data 823 in correlation with the time TM immediately before the time TM at which "12" was stored as the status ST, the processor 81 determines that the disappearing action was after the commodity registration operation.

If the disappearing action is not after a commodity registration operation, the processor 81 determines NO in ACT 55 and proceeds to ACT 56. In ACT 56, the processor 81 checks whether the disappearing action was after the settlement start operation. If the settlement start operation was performed on the self-service POS terminal 11, "23" will be stored as the status ST in the time-series data 823. Therefore, if "23" is stored as the status ST in the time-series data 823 in correlation with the time TM immediately before the time TM when "12" was stored as the status ST, the processor 81 determines that the disappearing action was after the settlement start operation.

If the disappearing action is not after a settlement start operation, that is, if the disappearing action occurs after the settlement end operation, the processor 81 determines NO in ACT 56. If the disappearing action is recognized for a customer at a self-service POS terminal 11 at which the settlement end operation was performed, it can be presumed that the customer left the self-service POS terminal 11 in order to leave the store in the normal manner. This disappearing action of such a customer is determined as not corresponding to an abnormal action. Then, the processor 81 ends the functioning of the determining unit 223.

In the waiting state of ACT 54 to ACT 56, if the disappearing action occurs after the stop operation, the processor 81 determines YES in ACT 54. If the disappearing action is recognized for a customer at the self-service POS terminal 11 at which the stop operation was performed, then it can be presumed the customer touched the softkey of "registration stop" for stopping registration or the softkey of "settlement stop" displayed on the touch panel 41 and then left the self-service POS terminal 11. Such action of the customer is also determined as not corresponding to an abnormal action. Then, the processor 81 ends the functioning of the determining unit 223.

In the waiting state of ACT 54 to ACT 56, if the disappearing action occurs after the commodity registration operation but before a stop operation, the processor 81 determines YES in ACT 55 and proceeds to ACT 57. In ACT 57, the processor 81 sets the message code MC to "91."

If the disappearing action is recognized for a customer at the self-service POS terminal 11 at which a commodity registration operation was performed, it is conceivable that the customer left the self-service POS terminal 11 along with commodities for which settlement is not yet completed. This action of the customer is determined as an abnormal action. The code "91" is described as the message code MC in the time-series data 823 in which a register number of the self-service POS terminal 11 is set. The message code MC "91" is a code for identifying "disappearance of a customer during the commodity registration operation."

In the waiting state of ACT 54 to ACT 56, if the disappearing action occurs after the settlement start operation but before a stop operation, the processor 81 determines YES in ACT 56 and proceeds to ACT 58. In ACT 58, the processor 81 sets the message code MC to "92."

If the disappearing action is recognized for a customer at the self-service POS terminal 11 at which a settlement start operation was performed, it is conceivable that the customer goes left the self-service POS terminal 11 along with commodities for which settlement is not yet completed. Such an action of the customer is determined as an abnormal action. The code "92" is stored as the message code MC in the time-series data 823 in which a register number of the self-service POS terminal 11 is set. The message code MC "92" is a code for identifying "disappearance of a customer during the settlement operation."

After finishing the processing in ACT 57 or ACT 58, the processor 81 proceeds to ACT 59. In ACT 59, the processor 81 acquires the present time TM from the clock 84.

In ACT 60, the processor 81 acquires a tracking ID by reference to the management table 821. Specifically, the processor 81 acquires, by reference to the management table 821, the latest tracking ID set in association with the register number of the self-service POS terminal 11 at which the use start operation was recognized. If just one tracking ID associated with the register number is present, then the latest tracking ID is that tracking ID. If more than one tracking ID is associated with the register number, then the latest tracking ID is, for example, the highest numbered tracking ID amongst the associated tracking IDs. Note, the processing in ACT 76 in FIG. 12 is the same as the processing in ACT 60.

In ACT 61, the processor 81 stores the tracking ID acquired in the processing in ACT 60, the time TM, and the message code MC in correlation with one another in the time-series data 823.

In ACT 71 in FIG. 12, the processor 81 checks whether an appearing action is recognized by the action recognizing unit 221. If the appearing action is recognized, "11" is stored as the status ST in the time-series data 823. Therefore, if "12" is already stored as the status ST in the time-series data 823 in correlation with the time TM immediately preceding the time TM when "11" was stored as the status ST, the processor 81 determines that the appearing action occurs after a disappearing action.

In ACT 72, the processor 81 calculates a time difference between the time TM when "11" was stored as the status ST and the time TM when "12" was stored as the status ST. That is, the processor 81 calculates a time difference between when the disappearing action was recognized by the action recognizing unit 221 and when the appearing action was recognized.

In ACT 73, the processor 81 checks whether the time difference is within a predetermined amount of time. The predetermined amount of time is, for example, thirty seconds or one minute. Any amount of time can be set.

If the time difference is not within the predetermined amount, the processor 81 determines NO in ACT 73 and ends the functioning of the determining unit 223.

If the time difference is within the predetermined amount, the processor 81 determines YES in ACT 73 and proceeds to ACT 74. In ACT 74, the processor 81 sets the message code MC to "93."

For the self-service POS terminal 11 at which the disappearing action of the customer is recognized, if a subsequent appearing action is recognized within some predetermined amount of time, it may be presumed that the customer briefly went away from the self-service POS terminal 11 in order to go back to the selling floor to pick up a commodity that the customer forgot to purchase and then returned to the self-service POS terminal 11 again. It is also possible that after one customer goes away from the self-service POS terminal 11 along with commodities for which settlement is not completed, another customer may arrive to perform registration and settlement operations on commodities at the self-service POS terminal 11. In any case, code "93" is stored as the message code MC in the time-series data 823 in which a register number of the self-service POS terminal 11 is set. The message code MC "93" is a code for identifying "appearance of a customer."

In ACT 75, the processor 81 acquires the present time TM clocked by the clock 84. In ACT 76, the processor 81 acquires a tracking ID by reference to the management table 821. In ACT 77, the processor 81 stores the tracking ID, the time TM, and the message code MC in correlation with one another in the time-series data 823. The processor 81 returns to ACT 53 in FIG. 11.

The function of the determining unit 223 is as explained above. If an appearing action is recognized again, the processor 81 executes the processing in ACT 52 to ACT 61 in FIG. 11 and ACT 71 to ACT 77 in FIG. 12 in the same manner as explained above.

Figure 13:
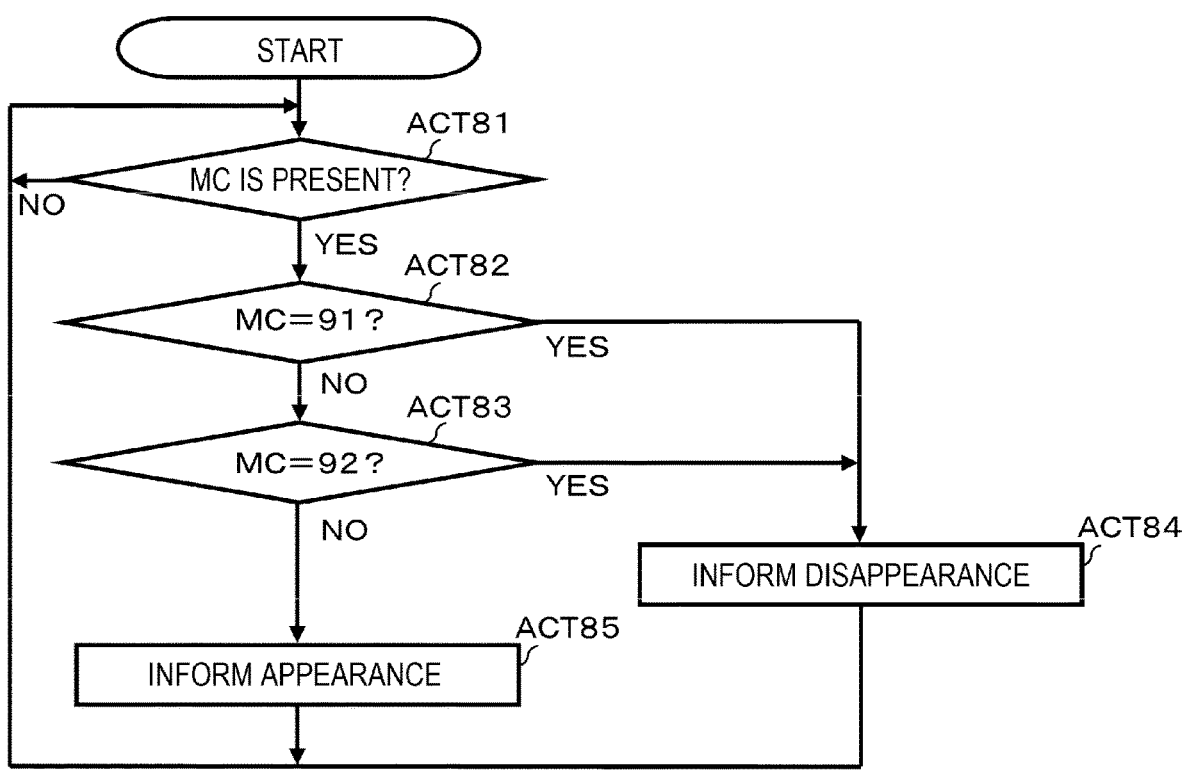
FIG. 13 is a flowchart of a function of an informing unit.

FIG. 13 is a flowchart of the functioning of the informing unit 224.

In ACT 81, the processor 81 waits for the message code MC to be stored in the time-series data 823. If the message code MC is stored in the time-series data 823, the processor 81 determines YES in ACT 81 and proceeds to ACT 82. In ACT 82, the processor 81 checks whether the message code MC is "91."

If the message code MC is "91," the processor 81 determines YES in ACT 82 and proceeds to ACT 84. In ACT 84, the processor 81 issues a command for informing "disappearance of a customer during the commodity registration operation." Specifically, the processor 81 searches the message table 822 for message data associated with the message code MC "91." The processor 81 acquires a register number of the time-series data 823 in which "91" is stored as the message code MC. The processor 81 outputs an informing command with the message data and the register number from the communication interface 87 to the display control apparatus 13.

The display control apparatus 13 causes the attendant terminal 14 identified by the register number included in the informing command to display text of the message data on the monitoring image SC of the attendant terminal 14. As a result, for example, text "a customer disappears during commodity registration operation in a register with a register No. X" is displayed on the monitoring image SC.

If the message code MC is not "91," the processor 81 determines NO in ACT 82 and proceeds to ACT 83. In ACT 83, the processor 81 checks whether the message code MC is "92."

If the message code MC is "92," the processor 81 determines YES in ACT 83 and proceeds to ACT 84. In ACT 84, the processor 81 issues a command for informing "disappearance of a customer during the settlement operation." Specifically, the processor 81 searches the message table 822 for message data associated with the message code MC "92." The processor 81 acquires a register number of the time-series data 823 in which "92" is stored as the message code MC. The processor 81 outputs an informing command with the message data and the register number from the communication interface 87 to the display control apparatus 13.

The display control apparatus 13 causes the attendant terminal 14 identified by the register number included in the informing command to display text of the message data on the monitoring image SC of the attendant terminal 14. As a result, for example, text "a customer disappears during the settlement operation in a register with a register No. X" is displayed on the monitoring image SC.

In this way, if the message code MC is "91" or "92," "disappearance of a customer during the commodity registration operation" or "disappearance of a customer during the settlement operation" is informed as an abnormal action by the informing unit 224, the attendant can takes measure for, for example, rushing to the self-service POS terminal 11 for which the register No. X is set to check a situation or search for the customer who performs the abnormal action.

If the message code MC is "93," the processor 81 determines NO in ACT 83 and proceeds to ACT 85. In ACT 85, the processor 81 issues a command for informing "appearance of a customer." Specifically, the processor 81 searches the message table 822 for message data associated with the message code MC "93." The processor 81 acquires a register number of the time-series data 823 in which "93" is stored as the message code MC. The processor 81 outputs an informing command with the message data and the register number from the communication interface 87 to the display control apparatus 13.

The display control apparatus 13 causes the attendant terminal 14 to display text (message data) on the monitoring image SC on the attendant terminal 14 for the register number included in the informing command. As a result, for example, the text "a customer appears in a register with a register No. X" is displayed on the monitoring image SC.

In this way, if "93" is stored as the message code MC in the time-series data 823, "appearance of a customer" is informed by the informing unit 224, and the attendant can takes measures for, for example, checking whether the customer appearing at the self-service POS terminal 11 for which the register No. X is set is the same customer that went back to the selling floor to pick up a commodity that the customer forgot to purchase and then returned to the self-service POS terminal 11.

The processor 81 after the processing in ACT 84 or ACT 85 returns to ACT 81. That is, if the message code MC is stored in the time-series data 823, the processor 81 executes the processing in ACT 82 to ACT 85 in the same manner as explained above. The functioning of the informing unit 224 is as explained above.

As explained above, the information processing apparatus 22 performs the functions of the action recognizing unit 221 and recognizes, based on imaging data of a camera 21, an action of the customer who performs an operation on the self-service POS terminal 11. The information processing apparatus 22 performs the functions of the operation recognizing unit 222 and recognizes the operation on the self-service POS terminal 11 by the customer. The operation on the self-service POS terminal by the customer is recognized based on data of the monitoring image SC output from the display control apparatus 13 to the attendant terminal 14. The information processing apparatus 22 performs the functions of the determining unit 223 and determines, based on a recognition result by the action recognizing unit 221 and a recognition result by the operation recognizing unit 222, presence or absence of an abnormal action of the customer from an action of the customer for a commodity for which commodity registration operation is recognized. The information processing apparatus 22 performs the functions of the informing unit 224 and informs the abnormal action of the customer if the presence of the abnormal action is determined by the determining unit 223.

If a disappearing action of a customer is recognized at a self-service POS terminal 11 on which the stop operation or the settlement end operation has been performed, it is determined that an action of this customer does not correspond to an abnormal action. In such a case, the disappearance of the customer is not informed to the attendant using the attendant terminal 14.

On the other hand, if a disappearing action of a customer is recognized at a self-service POS terminal 11 on which the commodity registration operation or the settlement start operation was performed but the stop operation was not performed, it is determined that an action of this customer is an abnormal action. In such a case, "disappearance of a customer during the commodity registration operation" or "disappearance of a customer during the settlement operation" is informed to the attendant using the attendant terminal 14.

Therefore, the attendant can take measures for, for example, rushing to the self-service POS terminal 11 to check a situation or search for the customer who performs the abnormal action.

For example, if, after a disappearing action ("disappearance of a customer during the commodity registration operation" or "disappearance of a customer during the settlement operation") at self-service POS terminal 11 is informed to the attendant, an appearing action of the customer at the same self-service POS terminal 11 is recognized within a predetermined time, an "appearance of a customer" is informed to the attendant using the attendant terminal 14.

Therefore, the attendant can take measures for, for example, checking the customer who reappeared at the self-service POS terminal 11 and checking whether the customer went to the selling floor to pick up a commodity that the customer forgot to purchase and returned to the self-service POS terminal 11.

In this way, it is possible to appropriately detect a suspicious action of the customer leaving the self-service POS terminal 11 without completing settlement.

In the above embodiment, one camera 21 is individually disposed for each one of the self-service POS terminals 11. However, a camera 21 does not always have to be individually disposed for each one of the self-service POS terminals 11. For example, if customers at two self-service POS terminals 11 adjacent to each other can be imaged by one camera 21, the number of cameras 21 can be reduced. In that case, in ACT 3 (FIG. 8), a register number of the self-service POS terminal 11 more closely matching the position of the person in imaging data is acquired. Additionally, multiple cameras 21 may be disposed for each one of the self-service POS terminals 11. With such an arrangement, it is possible to reduce blind spots in the coverage of the self-service POS terminal 11 and thus detect an action of a customer more accurately.

In an embodiment, if a disappearing action of a customer is recognized for the self-service POS terminal 11 at which the commodity registration operation or the settlement start operation was performed but at which the stop operation was not performed, "disappearance of a customer during the commodity registration operation" or "disappearance of a customer during the settlement operation" is informed to the attendant using the attendant terminal 14.

For example, if a customer who is performing the commodity registration operation or the settlement start operation goes away from the self-service POS terminal 11 while carrying a commodity without performing the stop operation, "disappearance of a customer during the commodity registration operation" or "disappearance of a customer during the settlement operation" may be informed to the attendant. However, if the customer goes away from the self-service POS terminal 11 without carrying a commodity, "disappearance of a customer during the commodity registration operation" or "disappearance of a customer during the settlement operation" need not be informed to the attendant. In such a case, for example, the processor 81 estimates a positional skeleton of the customer from the imaging data of the camera 21. The skeleton estimation can be performed by even an inexpensive camera 21 by using an AI technology such as deep learning. The processor 81 recognizes, for example, from a movement of the hand obtained by the skeleton estimation, a movement of the customer holding the purchased commodity in the hand.

In an example, if the customer who is performing the commodity registration operation or the settlement start operation goes away from the self-service POS terminal 11 without performing the stop operation and it is detected that a total weight of purchased commodities measured by the scale unit 51 decreases, "disappearance of a customer during the commodity registration operation" or "disappearance of a customer during the settlement operation" may be informed to the attendant. But if the total weight of the commodities measured by the scale unit 51 does not change and the customer leaves the self-service POS terminal 11, "disappearance of a customer during the commodity registration operation" or "disappearance of a customer during the settlement operation" need not be informed.

In an embodiment, if an appearing action of a customer is detected, the processor 81 generates a tracking ID for the customer. For example, the processor 81 may identify the customer from imaging data of the camera 21 based on the clothes being worn by the customer. For example, if the customer goes away from the self-service POS terminal 11 in order to go back to the selling floor and pick up a commodity that the customer forgot to pick up and then returns to the self-service POS terminal 11 again, the clothes being worn by the customer are presumably still the same because the customer going away from the self-service POS terminal 11 and the customer returning to the self-service POS terminal 11 again is the same person. In such a case, the processor 81 regards the detected appearing customer as the same person previously at the self-service POS terminal 11 and does not generate another tracking ID for the customer, but may keeping using the previously generated tracking ID. For example, after a customer goes away from the self-service POS terminal 11 together with commodities for which settlement is not completed, if a customer different from the previous customer performs registration and settlement operations at the self-service POS terminal 11, the clothes will be different or distinguishable. In such a case, the processor 81 regards the second customer as a different person and generates a tracking ID for the new customer.

In an embodiment, the informing unit 224 informs the attendant via the attendant terminal 14. But the informing destination is not limited to an attendant terminal 14. For example, the self-service POS terminal 11 at which an abnormal action was performed may itself be set as the informing destination. In such a case, light emitting unit 65 may emit light in a predetermined color to inform the store clerk that a disappearing action has been performed. Alternatively, the disappearing action may be indicated by message display on touch panel 41 or a sound output by a speaker or the like.

The attendant terminal 14 may perform the function of the display control apparatus 13 in some examples. In such a case, the operation recognizing unit 222 acquires data of the monitoring image SC from the attendant terminal 14 and recognizes operations on the self-service POS terminal 11 by a customer. Alternatively, the operation recognizing unit 222 may capture or receive, via a router, from the communication network 15, data signals output from the self-service POS terminals 11 and recognize the operations on the self-service POS terminal 11 performed by the customer based on these data signals.

In an embodiment, the self-service POS terminal 11 is used as a settlement terminal. In other examples, the settlement terminal may be separate from a POS terminal at which registration operations are performed. That is, a store clerk may perform the registration of commodities and then a customer separately performs the settlement. In such a case, the message table 822 includes "92" and "93" of the message code MC. That is, the message table 822 does not include "91" of the message code MC for identifying "disappearance of a customer during the commodity registration operation."

The information processing apparatus 22 may include a recording unit such as a video recorder that records imaging data captured from the cameras 21. For example, if a disappearing action or an appearing action of a customer is recognized, the imaging data captured in the recording unit may be reproduced to verify the disappearing action or the appearing action.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A detection apparatus for detecting abnormal operations at a point of sales (POS) terminal, the detection apparatus comprising:
    a camera interface configured to communicate with a camera for capturing an image of a customer who is operating a POS terminal;
    a network interface configured to communicate with a display control apparatus for an attendant terminal configured for monitoring a status of the POS terminal; and a processor configured to:
  identify an action performed by a customer using an image of the customer received via the camera interface,
  identify an operation performed at the POS terminal by the customer based on changes in monitoring screen data generated by the display control apparatus for the attendant terminal and received via the network interface,
  detect whether an abnormal operation is performed by the customer based on the identified action and the identified operation, and
  upon detecting an abnormal operation, control the network interface to transmit a first notification to the attendant terminal.

2. The detection apparatus according to claim 1, wherein the processor determines that an abnormal operation is performed when an image without the customer is received via the camera interface before an operation to complete payment is identified as performed by the customer.

3. The detection apparatus according to claim 1, wherein the processor is further configured to control the network interface to transmit a second notification to the attendant terminal if an image showing the customer is received via the camera interface within a predetermined time after an image without the customer is received via the camera interface.

4. The detection apparatus according to claim 1, wherein the processor does not detect that an abnormal operation is performed if an image without the customer is received via the camera interface after an operation to cancel a transaction is identified as performed by the customer.

5. The detection apparatus according to claim 1, wherein the processor is further configured to:
  generate a customer identifier upon receipt of an initial image of the customer via the camera interface,
  acquire a terminal identifier of the POS terminal, and
  store a code in association with the customer identifier and the terminal identifier, the code corresponding to an operation identified as performed by the customer.

6. The detection apparatus according to claim 5, wherein the processor is further configured to:
  acquire time information indicating when the operation was performed by the customer, and
  store the acquired time information in association with the code corresponding to the operation.

7. The detection apparatus according to claim 1, wherein the processor identifies the operation based on the change of one or more characters or numbers in the monitoring screen data generated by the display control apparatus.

8. The detection apparatus according to claim 7, wherein the characters or numbers include a name of a commodity being purchased, a number of commodities being purchased, or a price of a commodity being purchased.

9. The detection apparatus according to claim 1, wherein the POS terminal is a self-service POS terminal that allows a customer to perform registration and payment.

10. The detection apparatus according to claim 1, wherein the processor is further configured to issue the first notification to the POS terminal upon determining that an abnormal operation was performed.

11. A point of sales (POS) system, comprising:
  a POS terminal;
  a camera configured to capture an image of a customer who is operating the POS terminal;
  a display control apparatus configured to generate monitoring screen data corresponding to operations on the POS terminal;
  an attendant terminal configured to display the monitoring screen data from the display control apparatus as a monitoring screen indicating a status of the POS terminal; and
  a detection apparatus configured to:
    identify an action performed by a customer using an image of the customer captured by the camera,
    identify an operation performed at the POS terminal by the customer based on changes in the monitoring screen data,
    detect whether an abnormal operation is performed by the customer based on the identified action and the identified operation, and
    provide a first notification to the attendant terminal upon detecting an abnormal operation is performed.

12. The POS system according to claim 11, wherein the detection apparatus determines that an abnormal operation is performed when an image without the customer is captured by the camera before an operation to complete payment is identified as performed by the customer.

13. The POS system according to claim 11, wherein the detection apparatus is further configured to transmit a second notification to the attendant terminal if an image showing the customer is received via the camera interface within a predetermined time after an image without the customer is received via the camera interface.

14. The POS system according to claim 11, wherein the detection apparatus does not detect that an abnormal operation is performed if an image without the customer is captured by the camera after an operation to cancel a transaction is identified as performed by the customer.

15. The POS system according to claim 11, wherein the detection apparatus is further configured to:
  generate a customer identifier when an initial image of the customer at the POS terminal is captured by the camera,
  acquire a terminal identifier of the POS terminal, and
  store a code in association with the customer identifier and the terminal identifier, the code corresponding to an operation identified as performed by the customer.

16. The POS system according to claim 15, wherein the detection apparatus is further configured to:
  acquire time information indicating when the operation was performed by the customer, and
  store the acquired time information in association with the code corresponding to the operation.

17. The POS system according to claim 11, wherein the detection apparatus identifies the operation based on the change of one or more characters or numbers in the monitoring screen data generated by the display control apparatus.

18. The POS system according to claim 17, wherein the characters or numbers include a name of a commodity being purchased, a number of commodities being purchased, or a price of a commodity being purchased.

19. The POS system according to claim 11, wherein
  the POS terminal is a self-service POS terminal installed in a store and allowing a customer to complete registration and payment for one or more commodities, and
  the camera is installed in the store so that the POS terminal is shown in the captured image.

20. A method for detecting an abnormal operation for a point of sales (POS) system that includes a POS terminal and an attendant terminal, the method comprising:

capturing images of a POS terminal that can be operated by a customer;
identifying an action performed by the customer based on the captured images;
acquiring monitoring screen data generated for the attendant terminal for monitoring a status of the POS terminal;
identifying an operation performed at the POS terminal by the customer based on changes in the monitoring screen data;
detecting whether an abnormal operation is performed by the customer based on the identified action and the identified operation; and
providing a notification to the attendant terminal when an abnormal operation is detected.

* * * * *